(12) United States Patent
Hrubes et al.

(10) Patent No.: US 7,592,804 B2
(45) Date of Patent: Sep. 22, 2009

(54) CONTACTLESS EDDY CURRENT SENSOR AND PROCESS FOR DETECTING TEST OBJECTS

(75) Inventors: Franz Hrubes, Rotthalmünster (DE); Günter Schallmoser, Ruhstorf (DE)

(73) Assignee: Micro-Epsilon Messtechnick GmbH & Co. KG, Ortenburg (DE)

( * ) Notice: Subject to any disclaimer, the term of this patent is extended or adjusted under 35 U.S.C. 154(b) by 22 days.

(21) Appl. No.: 11/925,232

(22) Filed: Oct. 26, 2007

(65) Prior Publication Data

US 2008/0079420 A1 Apr. 3, 2008

Related U.S. Application Data

(63) Continuation of application No. PCT/DE2006/000562, filed on Mar. 30, 2006.

(30) Foreign Application Priority Data

Apr. 27, 2005 (DE) .................. 10 2005 020 007
Oct. 26, 2005 (DE) .................. 10 2005 051 536

(51) Int. Cl.
*G01B 7/14* (2006.01)
*G01R 33/12* (2006.01)

(52) U.S. Cl. ................... 324/207.26; 324/234
(58) Field of Classification Search ........... 324/207.22, 324/207.26, 228–243
See application file for complete search history.

(56) References Cited

U.S. PATENT DOCUMENTS

| 4,016,487 | A | 4/1977 | Neumaier |
| 5,017,869 | A | 5/1991 | Oliver |
| 5,559,428 | A | 9/1996 | Li et al. |
| 6,377,040 | B1 | 4/2002 | Hell |
| 2004/0032256 | A1 | 2/2004 | Tada et al. |
| 2004/0138838 | A1 | 7/2004 | Scheiner et al. |

FOREIGN PATENT DOCUMENTS

| DE | 25 09 927 A1 | 9/1976 |
| DE | 198 33 276 A1 | 2/2000 |

OTHER PUBLICATIONS

International Search Report for PCT/DE2006/000562, completed Jul. 28, 2006, and mailed Aug. 4, 2006.
International Preliminary Report on Patentability and Written Opinion for PCT/DE2006/000562, issued Oct. 30, 2007, mailed Nov. 8, 2007.

*Primary Examiner*—Reena Aurora
(74) *Attorney, Agent, or Firm*—Alston & Bird LLP

(57) ABSTRACT

The invention relates to a contactlessly working eddy current sensor, particularly for detecting essentially flat test objects, comprising at least one sensor coil, eddy currents being able to be induced in the test object. The invention is characterized in that the coil, when passing by the test object, is aligned in such a manner that the coil axis is oriented essentially parallel to a line normal to a surface to the test object, and that the test object can be moved past the sensor coil essentially parallel to the coil axis or the sensor coil can be moved past the test object. A corresponding method is carried out so that an eddy current can occur only once when the test object or coil is passed by.

16 Claims, 3 Drawing Sheets

CONTACTLESS EDDY CURRENT SENSOR AND PROCESS FOR DETECTING TEST OBJECTS

CROSS-REFERENCE TO RELATED APPLICATIONS

The present application is a Continuation of International Application No. PCT/DE2006/000562, filed Mar. 30, 2006, and which designates the U.S. The disclosure of the referenced application is incorporated herein by reference.

FIELD OF THE INVENTION

The present invention relates to an eddy current sensor operating without contact, in particular for detecting essentially flat test objects, and comprising at least one sensor coil, where eddy currents can be induced in the test object, as well as a corresponding process for detecting essentially flat test objects with an eddy current sensor operating without contact.

BACKGROUND OF THE INVENTION

In many fields of technology it is necessary to have rather precise information concerning a movement process. In particular in automated, controlled, or regulated systems, only these data permit reliable and efficient operation. A system of this type is, for example, a turbocharger in a motor vehicle. Through knowledge of the precise rotary motion of the compressor wheel not only the rotary speed of the turbocharger can be monitored and regulated according to the predefined theoretical values, but also an optimization of the efficiency of the entire motor can be effected. For as precise a representation of the rotary speed as possible, the individual blades of the compressor wheel are detected. In so doing, eddy currents frequently come into use in practice.

Blades of a compressor wheel of turbochargers normally consist predominantly of aluminum or, in particular in the case of commercial vehicles, titanium. These blades are very thin and usually have, e.g., in the case of titanium blades, a thickness of approximately only 0.5 to 0.7 mm. Depending on the manufacturing tolerances, in the detection of the blades with an eddy current sensor a detection spacing of approximately 2 mm must be adhered to. This can be achieved in the case of standard eddy current sensors only with correspondingly large coil diameters.

In the measuring device known from practice the coil is disposed in such a manner that the coil axis is oriented so as to be perpendicular to the direction of movement of the blade wheel. In this way, relatively high signal edges can be achieved. However, in the case of very narrow blades, an undesired effect occurs which makes the signal evaluation significantly more difficult. If a blade is moved past a sensor, there is an impedance change whose signal curve has the form of a double peak.

In connection with this, the signal trough is greatest when the blade is positioned so as to be centered above the sensor. This trough is strongly dependent on the blade thickness—the thinner the stronger—and on the electrical conductivity of the blade material—the lower the conductivity the deeper the trough.

To carry out an unambiguous detection process, a signal evaluation is thus carried out. Since, however, at the highest rotary speeds signal frequencies up to approximately 1 MHz have to be processed, the costs for the evaluation electronics increase significantly. This is too expensive, in particular for use in standard production.

The present invention is thus based on the objective of developing and extending a device of the type stated in the introduction in such a manner that detecting flat test objects can be done in a simple and economical manner. A corresponding process will be specified.

SUMMARY OF THE INVENTION

According to the invention the above objectives and others are realized. According thereto, in one embodiment the eddy current sensor under discussion is developed in such a manner that, when the test object passes, the coil is aligned in such a manner that the coil axis is oriented so as to be essentially parallel to a line normal to a surface of the test object and that the test object can pass by the sensor coil in the direction essentially parallel to the coil axis, or the sensor coil can pass by the test object in a corresponding manner.

In regard to the process, the above objective is realized by the features of another embodiment of the present invention. According thereto, the process under discussion is characterized by the fact that the sensor coil is disposed and moved with respect to the test object, or conversely, in such a manner that when the test object or the sensor coil passes only one time an eddy current can appear in the test object.

In a manner according to the invention it has first been recognized that through skillful orientation of the sensor coil the sensor signal can be simplified in an amazingly simple manner so that complicated signal processing can be omitted. An improvement of the signal processing is thus not necessary. Rather, the signal evaluation can be reduced and simplified significantly by the invention. For this purpose, according to the invention the sensor coil is tilted by 90° with respect to the position known from practice so that when the coil axis passes the test object, or conversely, it is oriented so as to be essentially parallel to the surface normal to the test object. If, in addition, the test object is structured in such a manner that it can be moved past the sensor coil, or conversely the sensor coil can be moved past the test object, in a direction essentially parallel to the coil axis, then in a measurement of the impedance a signal curve results which merely has one peak per blade wheel. Thus, according to the invention double peaks no longer occur and the signal evaluation is simplified significantly.

In the eddy current sensors known from practice the sensor coil is energized with an AC current which creates an electromagnetic field radiated by the sensor coil. The sensor coil has in connection with this a characteristic impedance which is increased depending on electrically conductive materials in the field area of the coil. If an electrically conductive object approaches the sensor coil, then eddy currents are generated in the area of the surface of the electrically conductive object by the electromagnetic field. These eddy currents in return act on the sensor coil in such a manner that the impedance of the sensor coil is increased. The higher the increase, the better the eddy currents can propagate in the electrically conductive object. Large surfaces facing toward the sensor coil generate in this connection a particularly large impedance increase. If, however, flat, and in particular narrow, test objects are supposed to be detected, then, on the test object's narrow side facing the front face of the coil, eddy currents can only be formed to a limited extent.

When the test object passes, however, the stray field induces, in the lateral faces parallel to the coil axis, eddy currents which likewise lead to an increase of the impedance. Due to this, the characteristic profile in the form of a peak arises, where the impedance increase becomes minimal when the test object comes to lie so as to be centered on the coil axis.

In this position no eddy currents in the lateral faces of the test object due to stray fields of the coil are possible. Merely the eddy currents induced in the narrow side of the test object have an effect.

Through, according to the invention, the sensor coil's turning from the position known from practice, the formation of peaks is effectively avoided. If the coil axis lies essentially in the direction parallel to the surface normals of the test object, then in the test object, merely as a consequence of the stray field of the sensor coil, eddy currents are induced in the test object. The trough of the measurement signal as a consequence of the lacking effect of the stray field is thus effectively avoided. Thus, due to the unambiguous signal form, a significantly simpler signal processing can be carried out and good measurement results can nonetheless be achieved. Through an optimized configuration of the coil the measurement results can be improved still further. Thus, the detection spacing can be enlarged by an oval or rectangular sensor coil or the required sensor diameter can be reduced. In so doing, one exploits the fact that over a longer interval than in the case of a round coil the actively acting coil side is located near the test object and thus the effect is correspondingly greater.

In an advantageous manner, by turning the coil in the eddy current sensor according to the invention the achievable detection spacing is increased while the coil dimensions remain constant. Corresponding tests have in addition shown that the measurement signal is also hardly less with a difference in the angle of up to 20° with respect to the optimal parallel arrangement. In this connection, it is precisely in the case of extremely narrow test objects, in which the narrow side of the test object is facing essentially towards the sensor when the sensor coil passes, that the eddy current sensor according to the invention and the process according to the invention can be used particularly well. In particular, the test objects can have any beveling. Thus, it is irrelevant to the quality of the measurement signal whether the test object's narrow side facing towards the sensor coil is plane, rounded, or has another profile.

In connection with this, it must be ensured that the sensor is aligned to the direction of movement of the test object, which, however, in the case of test objects whose direction of movement is known in principle, e.g., in the case of a compressor wheel of the turbocharger, presents no problem. The sensor could then be manufactured so that the coil alignment is either characterized and the sensor can thus be adjusted accordingly, or that through a mechanical arresting aid, such as, for example, a nose or a slot in one of the sensor sides, or through comparable measures, only a fastening in a defined position is possible.

In an advantageous manner the eddy current sensor is energized with an AC current, where preferably a sinusoidal AC current is used. However, other signal forms with, for example, a rectangular or saw-toothed curve are also conceivable. Through the use of a sinusoidal AC current the evaluation is, however, further simplified.

An evaluation circuit registers the impedance of the sensor coil and/or, caused by the test object, the change of the impedance of the sensor coil and tracks the impedance's change over time. For this purpose, all the processes known from practice can be used. From the impedance's curve as a function of time, the movement of the test object and/or the speed of the test object with respect to the sensor coil, or conversely, can be deduced in a simple manner. In so doing, the evaluation circuit is then designed particularly simply if the evaluation circuit comprises a trigger, e.g., a Schmitt trigger. A good measurement result can thus be achieved just through the impedance's simple curve as a function of time.

In an advantageous manner, the measurement signal is supplied directly, or a digital evaluation circuit's measurement signal prepared by amplifiers, equalizers, or other circuits is supplied. This circuit preferably comprises a digital computer in the form of a microcontroller, a digital signal processor, or the like.

With the use of an eddy current sensor of this type, the movement, and therefore the presence of a test object, and the speed of the test object can be determined reliably. If two or more sensor coils at a distance from one another are used, then the direction of the movement can be determined in addition by the eddy current sensors according to the invention.

BRIEF DESCRIPTION OF THE DRAWINGS

The inventive device and method will be described in more detail hereinbelow with the aid of an exemplary embodiment of the inventive apparatus, with reference to the accompanying drawings.

DETAILED DESCRIPTION OF PREFERRED EMBODIMENTS

Figure 1:
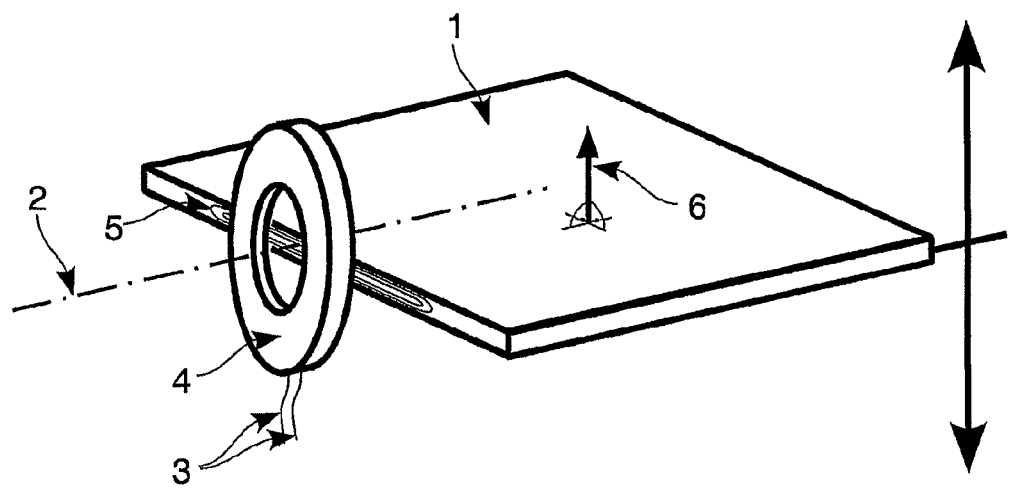
FIG. 1 shows a schematic representation of the eddy current sensor known from practice.

FIG. 1 shows a schematic representation of an eddy current sensor known from practice. A test object 1 moves in the direction perpendicular to the coil axis 2 of a sensor coil 4 energized with an alternating current via the connections 3. With the sensor coil 4, electromagnetic fields are thus generated, which generate eddy currents 5 in the test object 1.

Since eddy currents 5 form on the surface of an object 1, it can be seen clearly with the aid of FIG. 1 that an impedance increase due to these eddy currents is only possible to a very limited extent.

Figure 2:
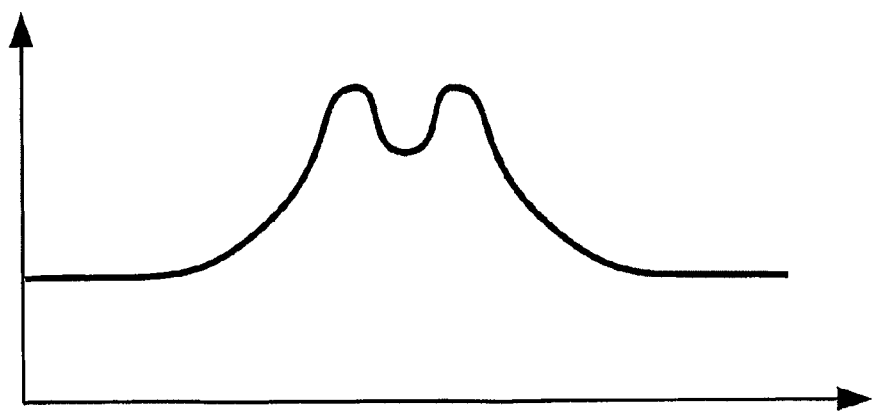
FIG. 2 shows a schematic representation of the curve of the measurement signal when using an eddy current sensor according to FIG. 1.

In FIG. 2 the curve of the measurement signal, i.e., the impedance, can be seen over time. Therein it is assumed that the test object 1 moves past the sensor coil 4 in a uniform manner. Particularly clearly to be seen therein is the trough and, caused thereby, the formation of peaks. Along with this, the trough can turn out to be still deeper if the test object is formed to be still narrower or, as a consequence of oxidation, contamination, or generally poorer conductivity of the test object 1, the ohmic resistance to the eddy current is great.

Figure 3:
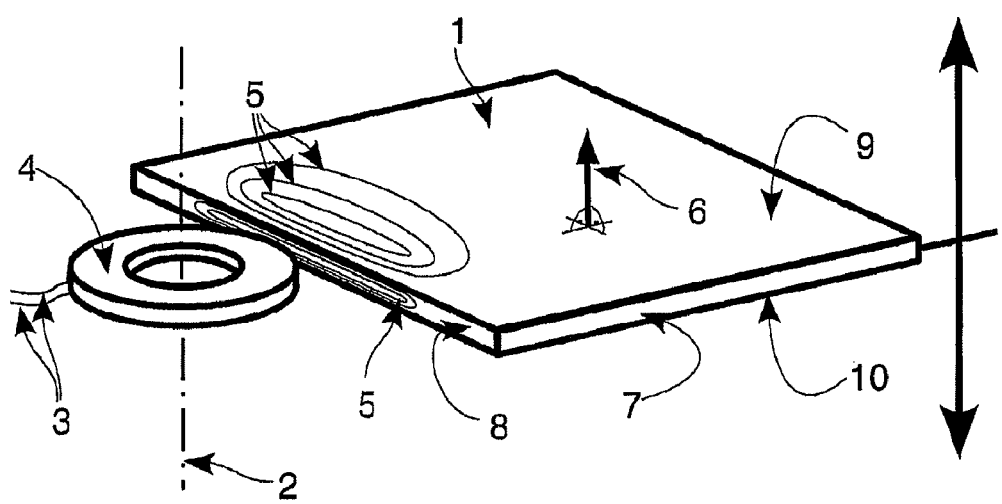
FIG. 3 shows a schematic representation of an embodiment example of the eddy current sensor according to the invention.

FIG. 3 shows an eddy current sensor according to the invention and in which the formation of peaks is avoided. Therein the sensor coil 4 is disposed in such a manner that the coil axis 2 is oriented so as to be essentially parallel to a line 6 which is normal to the surface 9 of the flat test object 1. The test object 1 is moved past the sensor coil 4 in the direction parallel to the coil axis 2. In this connection let it be pointed out in particular that in FIG. 3, merely for simplicity's sake, a square test object 1 is represented, although the test object 4 can also be structured in a more complex manner. Thus, it is irrelevant whether the test object 4, e.g., in the case of a turbocharger blade, is beveled on the narrow sides 7 facing away from the eddy current sensor. Likewise, the side 8 facing toward the sensor coil 4 can be formed in a relatively arbitrary manner. Along with the rectangular profile represented here, a rounded edge would, for example, be conceivable.

According to the invention, eddy currents are formed not exclusively in the side 8 facing toward the sensor coil 4, but rather, as a consequence of the stray fields, eddy currents can also be induced in the surfaces 9 and 10, whereby the impedance increase caused by the test object 1 is amplified.

Figure 4:
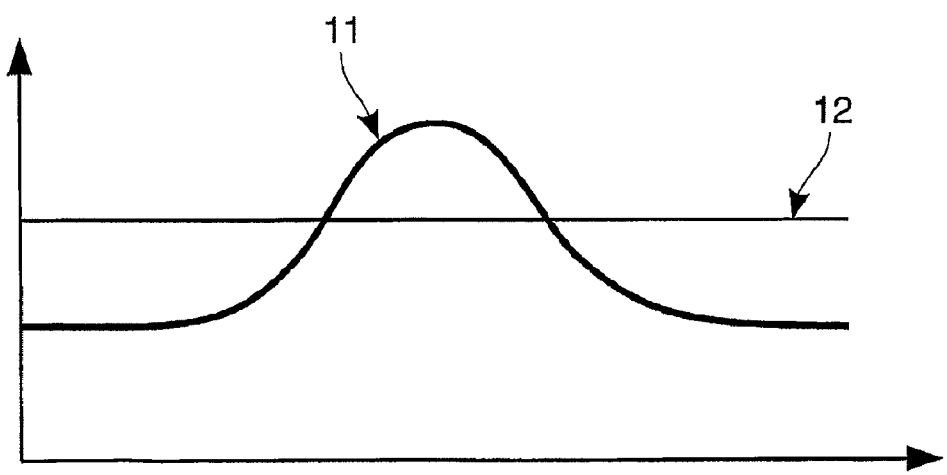
FIG. 4 shows a curve, as a function of time, of the measurement signal of the eddy current sensor according to the embodiment example from FIG. 3.

In FIG. 4 the curve 11, as a function of time, of the measurement signal or the impedance is represented. In contradistinction to FIG. 2, this signal curve 11 has, however, no trough. Thus, by a simple introduction of a threshold value 12 it can be detected whether the test object is located in the range of the eddy current sensor. For example, detection of a compressor wheel of a turbocharger is reproduced by this curve. With the presence of a uniform movement, a periodic signal curve arises, from which the rotary speed can be determined. Accelerated or delayed rotary movements express themselves in a decreasing or increasing period.

Figure 5:
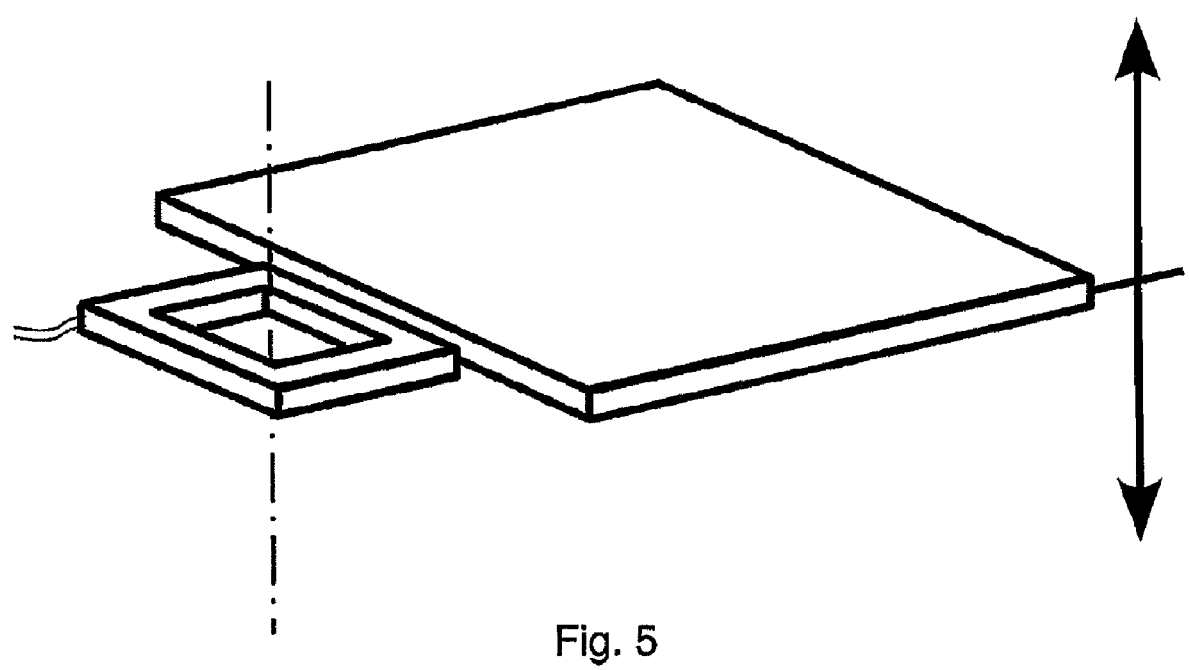
FIG. 5 shows a development of the eddy current sensor according to the invention with a rectangular base surface.

FIG. 5 shows an alternative development of the sensor coil 4 with a square cross section. Therein it can be seen clearly that the spacing of the individual points of the coil is less due to this special configuration.

In conclusion let it be emphasized quite particularly that the embodiment example chosen in advance purely arbitrarily merely serves to explain the teaching according to the invention but does not restrict it to this embodiment example.

That which is claimed is:

1. A contactless eddy current sensor for detecting essentially flat test objects, comprising:
   at least one sensor coil where eddy currents can be induced in the test object, the sensor coil defining a coil axis,
   wherein the sensor coil is configured to move relative to the test object or the test object is configured to move relative to the sensor coil,
   wherein the sensor coil, when passing the test object or when being passed by the test object, is aligned in such a manner that the coil axis is oriented so as to be substantially parallel to a line which is normal to a surface of the test object, and
   wherein the test object moves past the sensor coil, or the sensor coil moves past the test object, in a direction substantially parallel to the coil axis.

2. The contactless eddy current sensor according to claim 1, wherein the test object is formed to be narrow with a narrow side of the test object facing substantially towards the sensor when the sensor coil passes.

3. The contactless eddy current sensor according to claim 1, wherein windings of the sensor coil span a substantially geometric surface.

4. The contactless eddy current sensor according to claim 3, wherein the geometric surface comprises a surface selected from the group consisting of: a substantially rectangular, substantially square, substantially circular, substantially oval, substantially hexagonal, or other substantially polygonal surface.

5. The contactless eddy current sensor according to claim 1, wherein an impedance or a change of the impedance of the sensor coil is measured.

6. The contactless eddy current sensor according to claim 5, wherein a curve, as a function of time, of the impedance of the sensor coil can be determined.

7. The contactless eddy current sensor according to claim 5, wherein the measured values from the measurement of the impedance or the change of the impedance of the sensor coil can be supplied to an evaluation circuit.

8. The eddy current sensor according to claim 6, wherein the evaluation circuit comprises a trigger.

9. The eddy current sensor according to claim 1, wherein the sensor coil is mounted on a preferably adaptable holding device.

10. A process for detecting narrow test objects by means of an eddy current sensor which comprises at least one sensor coil, wherein the sensor coil defines a coil axis said process comprising:
    moving the sensor coil relative to the test object, or moving the test object relative to the sensor coil, in such a manner that when the test object or the sensor coil passes, an eddy current appears in the test object,
    wherein the step of moving the sensor coil or moving the test object comprises the steps of:
       aligning the sensor coil with the test object in such a manner that the coil axis is oriented so as to be substantially parallel to a line which is normal to a surface of the test object, when the sensor coil passes by the test object or the test object passes by the sensor coil; and
       moving the sensor coil past the test object or moving the test object past the sensor coil in a direction substantially parallel to the coil axis, when the sensor coil passes by the test object or the test object passes by the sensor coil.

11. The process according to claim 10, wherein an AC current flows through the sensor coil.

12. The process according to claim 11, wherein the AC current comprises a substantially sinusoidal AC current.

13. The process according to claim 10, further comprising measuring the impedance of the sensor coil or the change of the impedance of the sensor coil.

14. The process according to claim 13, further comprising determining the impedance's curve as a function of time from the impedance or the change of the impedance of the sensor coil.

15. The process according to claim 14, further comprising deducing the movement of the test object or the speed of the test object with respect to the sensor coil, or the movement of the sensor coil or the speed of the sensor coil with respect to the test object, from the impedance's curve as a function of time.

16. The process according to claim 10, further comprising determining the direction of the movement by using two or more sensor coils at a distance from one another.

* * * * *

UNITED STATES PATENT AND TRADEMARK OFFICE
CERTIFICATE OF CORRECTION

PATENT NO. : 7,592,804 B2  
APPLICATION NO. : 11/925232  
DATED : September 22, 2009  
INVENTOR(S) : Hrubes et al.

It is certified that error appears in the above-identified patent and that said Letters Patent is hereby corrected as shown below:

Title page,

Item (73) Assignee, "Messtechnick" should read --Messtechnik--.

Signed and Sealed this

Sixteenth Day of February, 2010

David J. Kappos  
*Director of the United States Patent and Trademark Office*